Figure 1:
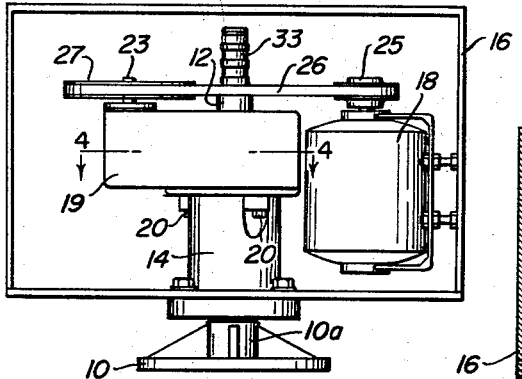

June 7, 1960   G. P. MARGETTS   2,939,330
MACHINE FOR ROTATING SIGNS, DISPLAYS, ETC.
Filed May 11, 1959

INVENTOR.
GEORGE PHILLIP MARGETTS

BY *Mallinckrodt &*
*Mallinckrodt*

ATTORNEYS

United States Patent Office 2,939,330
Patented June 7, 1960

2,939,330

MACHINE FOR ROTATING SIGNS, DISPLAYS, ETC.

George Phillip Margetts, 3785 Ash Circle,
Salt Lake City, Utah

Filed May 11, 1959, Ser. No. 812,200

4 Claims. (Cl. 74—411)

This invention relates to machines for rotating various things, such as electrically lighted outdoor advertising signs, displays, beacon lights, platforms, etc.

Various forms of so-called "turning units" have been developed heretofore to meet demands for electrical display signs that slowly and continuously rotate. These are usually equipped with readily adjustable safety clutches, which maintain positive drive relationship between the motor and the sign at all times, except when excessive and dangerous counter-torque is exerted on the sign by an external force, such as wind. Given proper adjustment, the clutch permits slippage to accommodate the counter-torque existing under such an exceptional condition.

As constructed heretofore, sign-turning machines have had their clutch mechanisms exposed to the weather. Constant supervision has been required to maintain the safety feature.

A principal object of the present invention is to provide a sign-turning machine of simple, economical, and sturdy construction, having torque-limiting mechanism completely protected from the weather and from tampering.

A feature of the invention in the accomplishment of this object is the utilization of a completely rigid shaft, a lubricant-containing, power transmission gear box through which the shaft extends and which serves as an important component of the drive means for rotating the sign, and a torque-limiting coupling between the shaft and a shaft-encircling, power transmission gear within the gear box.

In this way, the torque-limiting coupling is completely protected from the weather by being located within the gear box. No adjustment is necessary nor desirable, for the coupling is constructed to provide requisite safety. I have found that the presence of gear lubricant within the gear box in intimate association with the torque-limiting coupling does not interfere with proper functioning of the latter, but, rather, protects it against the rust and corrosion which so often interferes with the proper functioning of clutch mechanisms associated with conventional sign-turning units.

Another important object is to provide a construction wherein the gear box may be easily and conveniently removed from an installed machine, for servicing or repair, without disturbing the support afforded the sign by the machine.

This is accomplished by adequately supporting the shaft independently of the gear box, a feature of the invention being that a sleeve equipped with bearings serves to journal the shaft exteriorly of the gear box and to mount a sign on the machine, or to mount the machine with respect to a support, as the case may be, and that the gear box portion of the shaft is removable from the remainder of the shaft and the gear box is removably attached to the sleeve.

Further objects and features of the invention will become apparent from the following detailed description of the particular preferred embodiments illustrated by way of example in the accompanying drawing.

Figure 2:
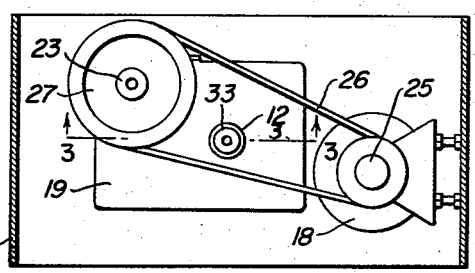
Figure 3:
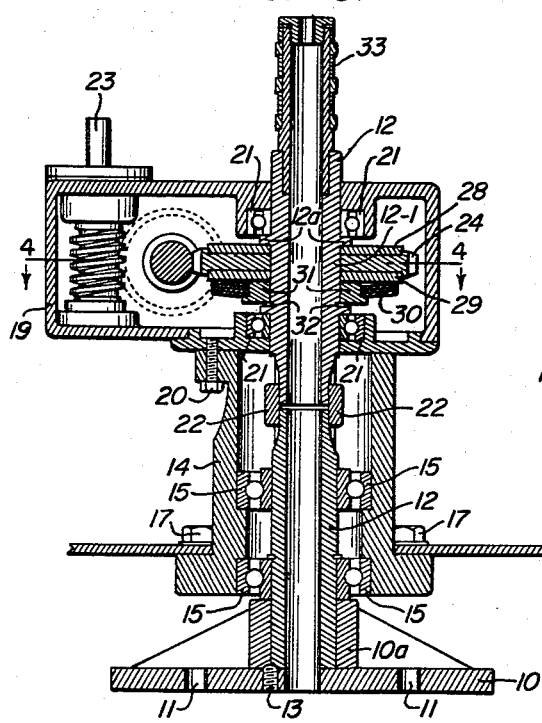

In the drawing:

Fig. 1 represents a front elevation of the machine as constructed for rotating an outdoor, electrical, display sign;

Fig. 2, a top plan view of the machine of Fig. 1;

Fig. 3, an axial vertical section taken along the line 3—3 of Fig. 2; and

Figure 4:
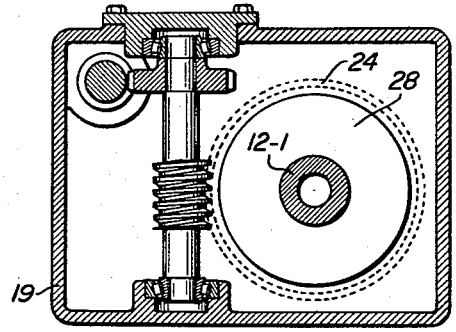

Fig. 4, a detail horizontal section taken on the line 4—4 of Fig. 1.

Referring to the drawing:

As illustrated, the machine is particularly adapted for mounting on a supporting post (not shown) with a sign surrounding and covering it. A mounting base 10 is provided with bolt holes 11, so that the machine may be rigidly bolted to the top of such post or to some other stationary support about which the sign can rotate.

A shaft 12 extends from rigid securement, as by means of a pressed fit, to a hub portion 10a of the mounting base 10, a keying screw 13 being advantageously employed to give greater resistance to torque loads imposed upon the shaft.

The sign is rotatably mounted on shaft 12 by means of a mounting sleeve 14, which is equipped with antifriction bearings 15 of thrust absorbing, radial type that serve to journal an intermediate portion of the shaft. A frame 16, rigidly attached to mounting sleeve 14 as by means of cap screws 17, serves as securement for the sign proper and as a means for mounting an electric drive motor 18. Sleeve 14 and frame 16 and the sign attached thereto are rotated relative to base 10 and shaft 12.

In some instances, it may be preferred to reverse the machine and mount frame 16 on the post and the sign on mounting base 10. This may be done without difficulty. Under such circumstances, base 10 and shaft 12 rotate relative to sleeve 14 and frame 16.

For driving the rotatable parts of the machine, a power transmission gear box 19 is rigidly secured to mounting sleeve 14, preferably removable as by means of cap screws 20, shaft 12 extending therethrough and being journaled therein by antifriction bearings 21.

As mentioned hereinbefore, quick and convenient removability of gear box 19 for servicing or repair is a feature of this invention. To this end, the portion of shaft 12 that passes through gear box 19 is made as a separable section 12—1. In the present construction, see Fig. 3, the adjoining ends of such shaft section 12—1 and the shaft proper 12 are splined and rigidly joined by a mating collar 22, which permits shaft section 12—1 to be easily slipped out and replaced, axially, as gear box 19 is lifted from and replaced on mounting sleeve 14.

Gear box 19 contains customary gearing, here shown as a double reduction worm gear drive adapted to transmit power at reduced speed from an input shaft 23 to a worm gear 24 encircling and coupled to shaft section 12—1. Such gear box is adapted to contain gear lubricant in customary manner.

The drive pulley 25 of motor 18 is connected by belt 26 to driven pulley 27, which is mounted on input shaft 23 exteriorly of the gear box.

For the purpose of limiting the amount of torque that can be imposed on shaft 12 and, therefore, the amount of stress that can be imposed on the driving mechanism in general, worm gear 24 is freely rotatable with respect to shaft section 12—1 on which it is mounted, but is frictionally coupled thereto by torque-limiting plates 28 and 29 of disk formation, which are themselves splined to shaft section 12—1 so as to be non-rotatable relative thereto but movable axially therealong and which are disposed in face-to-face relationship with worm gear 24 at respectively opposite sides thereof. Constant loading springs 30, preferably of Belleville type, bear against friction disk 29, pressing it tightly against worm gear 24 and, in turn, pressing such worm gear tightly against friction disk 28. Axial movement of friction disk 28 in the direction of the pressure exerted against it is prevented by an annular shoulder 12a projecting from shaft section 12—1. A stepped retainer ring 31, held in place by a resilient lock ring 32 which is snapped into an annular receiving recess in shaft section 12—1, serves to hold springs 30 under compression.

The disks 28 and 29 and the worm gear 24 are mutually different structural materials having widely different degrees of hardness, so as to frictionally interlock under conditions of normal torque and to, in effect, act as a brake which holds the sign from turning in the direction of forces, such as wind load, exerting counter-torque thereon. If, however, such counter-torque forces become so great as to threaten damage to the mechanism, the braking action gives way and the braking disks and worm gear slip relative to each other. It is preferred to make the braking disks of hardened steel and the worm gear of bronze.

Any wear between the braking disks and the worm gear is immediately and automatically taken up by the springs, although wear is kept to a minimum by reason of the fact that such disks and gear are constantly bathed in oil. By using a constant loading or zero rate, Belleville spring, the braking action remains substantially uniform despite change in compression brought about through wear.

In assembling the machine, the required number of Belleville springs to establish a selected torque limit are employed. They are preferably compressed to a maximum when installed.

As is common in sign-turning machines of the type concerned, shaft 12 and mounting base 10 are hollow and open-ended to conveniently accommodate the electrical wiring (not shown) which powers the sign, and an electrical commutator assembly 33 is secured to the free end of the shaft.

It should be noted that mounting sleeve 14 and its bearings 15 absorb the entire load of the sign, as well as any bending or twisting moments of force that may be imparted during use. No load is imparted to gear box 19 and its bearings 21.

It should also be noted that the setting of counter-torque limit by selection of an appropriate number of constant loading Belleville springs means that no adjustment is necessary throughout the useful life of the machine and that constant lubrication, protection from the weather, and protection from tampering can be effectively obtained.

Whereas this invention is here specifically illustrated and described with respect to only one embodiment thereof, it should be realized that various changes may be made and various other structural forms may be utilized without departing from the essential contributions to the art made by the teachings hereof and defined by the claims which follow.

I claim:

1. In a sign-turning machine having a completely rigid, rotary, hollow shaft provided with electrical commutator means at one end and mounting means at the other end, means for rotating said shaft, comprising a lubricant-containing, power transmission gear box through which said shaft extends; bearing means journaling said shaft with respect to said gear box; a worm gear within said gear box encircling said shaft in freely rotatable relationship therewith; torque-limiting plates encircling and splined to said shaft in face-to-face, pressure-exerting relationship with the worm gear; constant loading spring means establishing a predetermined, torque-limiting pressure between said plates and the worm gear, said plates and worm gear being of structural material having widely differing degrees of hardness so as to effect frictionally locked interengagement under conditions of normal torque but permitting relative rotation under conditions of excessive torque; drive means; power transmission gears within said gear box interconnecting the drive means with said worm gear; and second mounting means having bearings journaling said shaft between the first mounting means and said gear box.

2. The combiation set forth in claim 1, wherein the portion of the shaft which is journaled by the gear box is formed as a separate section; wherein there are provided means rigidly but removably connecting said portion with the remainder of the shaft; and wherein there are provided means removably fastening said gear box to the second mounting means.

3. A rotating machine, comprising a completely rigid shaft; means for mounting said shaft on a stationary support; means for mounting a thing to be rotated on said shaft; a lubricant-containing, power transmission, gear box through which said shaft extends; bearing means journaling said shaft with respect to said gear box; a worm gear within said gear box encircling said shaft in freely rotatable relationship therewith; torque-limiting plates encircling and splined to said shaft in face-to-face, pressure-exerting relationship with the worm gear; constant loading spring means establishing a predetermined, torque-limiting spressure between said plates and the worm gear, said plates and worm gear being of structural material having widely differing degrees of hardness so as to effect frictionally locked interengagement under conditions of normal torque but permitting relative rotation under conditions of excessive torque; drive means; and power transmission gears within said gear box interconnecting the drive means with said worm gear.

4. The rotating machine of claim 3, wherein the portion of the shaft which is journaled by the gear box is formed as a separate section; wherein there are provided means rigidly but removably connecting said portion with the remainder of the shaft; and wherein there are provided means removably fastening said gear box to the second mounting means.

References Cited in the file of this patent
UNITED STATES PATENTS

| | | |
|---|---|---|
| 1,469,780 | Dean | Nov. 12, 1919 |
| 1,699,463 | Cresci | Aug. 15, 1927 |
| 1,740,845 | Tilbe | Nov. 20, 1928 |
| 1,989,869 | Kohn | Feb. 5, 1935 |
| 2,084,808 | Hyde | June 22, 1937 |
| 2,284,672 | Merkle | June 2, 1942 |
| 2,581,123 | Merkle | Dec. 13, 1946 |